No. 660,158.  
B. C. HICKS.  
VEHICLE.  
(Application filed Mar. 10, 1899.)  
Patented Oct. 23, 1900.

(No Model.)

Witnesses  
H. J. Hinkel  
N. M. Gillman, Jr.

Inventor  
John C. Hicks  
by John Freeman  
Attorneys

UNITED STATES PATENT OFFICE.

BOHN C. HICKS, OF CHICAGO, ILLINOIS, ASSIGNOR TO THE HICKS MOTOR CYCLE COMPANY, OF SAME PLACE.

VEHICLE.

SPECIFICATION forming part of Letters Patent No. 660,158, dated October 23, 1900.

Application filed November 10, 1899. Serial No. 736,493. (No model.)

*To all whom it may concern:*

Be it known that I, BOHN C. HICKS, a citizen of the United States, residing at Chicago, in the county of Cook and State of Illinois, have invented certain new and useful Improvements in Vehicles, of which the following is a specification.

My invention makes use of two or more frames separately mounted upon independent or partially-independent supports and cooperating to jointly support the body and motive mechanism of an automobile, whereby the transmission of shocks imparted to either of said frames to the other or to the body of the vehicle is diminished.

The invention consists in adapting and relating preferably two such independent cooperating frames, one of said frames superimposing or lapping the other, or partially so, the lower or inner of said frames being independently mounted upon its own supports, the upper or outer of said frames being independently mounted upon supports of its own at one end and at the other end passing over or lapping one end of said lower frame and resting upon, being supported by, and operatively connected with said lower frame and its supports at any point upon or between said supports, whereby a compensating effect is obtained in the vertical movement of the two frames and shocks resulting from inequalities in the roadway or from the vibration of the motive mechanism are divided and counteracted.

An embodiment of my invention is set forth in the accompanying drawings, of which—

Figure 1:
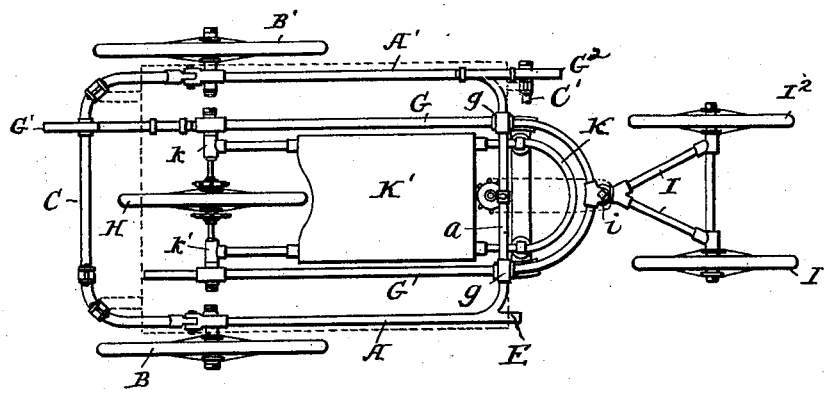
Figure 2:
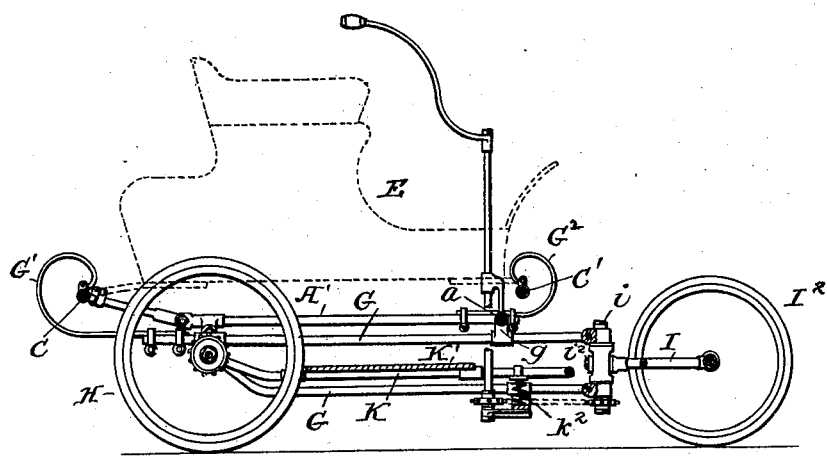

Figure 1 is a plan view of the running-gear of a vehicle, and Fig. 2 a sectional elevation taken on the line 2 2 of Fig. 1 and showing the wagon-body in dotted outlines.

Referring to the drawings, as shown, the main frame of the vehicle is composed of the parts A, A', and a. Said frame is supported at its rear end by the wheels B B', operatively connected therewith, and at its forward end by the operative connections g, shown as sleeves, resting upon the coöperating frame G. The said coöperating or lower or inner frame of the vehicle, which is shown at G, is supported at its rear end by one or more wheels H and at its forward end by the wheels I' and I², with which it is operatively connected.

In order to furnish a platform upon which to mount any desired motor or engine or for other purposes, an auxiliary supporting-frame may be provided, as shown at K, which is pivotally mounted on the axle of the wheel H, as by the sleeves $k\ k'$, and it may be yieldingly supported by said axle or by the frame K by springs, as $k^2$, or other means. The frame K may be provided with a platform K' for the support of an engine or other purpose.

To support the forward portions of the frames and to provide steering mechanism for turning and guiding the vehicle, suitable means may be provided—as, for instance, the forward end of the frame G may be operatively or pivotally connected with a steering-head constructed after the manner of that of a bicycle or in any other suitable form. As shown, the wheels I' and I² are operatively connected with the frame G. These may be pivotally connected, as shown at $i$, so that the steering-wheels I' and I² may move laterally or in any other convenient manner. To provide means whereby the frame may better accommodate itself to undulations in the road-bed, the stud $i$ is adapted to turn upon or furnish a bearing for the connection I, with which it is operatively connected, whereby said connection I, through the medium of the stud $i^2$, is permitted to rotate or to turn relatively as to the stud $i$. It is obvious that any other means of making a satisfactory joint or operatively connecting the frame G with the axles of wheels I' and I² may be employed to obtain movement in various directions. An advantage in this form and construction in some vehicles is that room is provided for the turning or swinging movement of the steering-wheels without interference with other parts. It is obvious that the body of the vehicle at its rearward portion may be supported directly upon either of said frames or partly upon each and that any desired form of connecting mechanism or intervening cushioning device may be employed.

As shown, a bar C flexibly connects with the ends of the frame A A' and through the flexible connection G' with the frame G, whereby the two frames are operatively and flexibly connected at their rear ends and the wheels B, B', and H are permitted to rise and fall independently. As shown, the rear supporting-points of the vehicle-body E are attached to the bar C near its connections with the extension G' of the frame G; but it is obvious that such connections may be at any point in the longitudinal extent of the bar C and that in proportion as they are nearer to the connection with either frame the body will partake of the movement of said frame, and vice versa, and that said proportions may be adjusted. The front of the vehicle-body is shown supported at the point C' upon an extension $G^2$ of the main frame A'.

It is evident that the form and construction of the frames may vary to suit requirements and that the frames may interlace or may overhang each other in varying degree without departing from the principles of the invention; also, that any number of wheels may be used for the support of the frames respectively.

Without restricting myself to the particular forms and constructions shown, I claim—

1. In a vehicle, a frame having independent rolling supports operatively attached thereto and supporting said frame throughout its longitudinal extent, a frame supported at one end by independent rolling supports operatively attached thereto and supported at its other end by and flexibly connected with said independently-supported frame, connections flexibly connected with the free ends of said frames respectively and operatively connecting the frames; whereby said frames are permitted independent movements and said connections at the free ends of said frames partake partly of the movements of both frames.

2. In a vehicle, a frame having independent rolling supports operatively attached thereto and supporting said frame throughout its longitudinal extent, a frame supported at one end by independent rolling supports operatively attached thereto and supported at its other end by and flexibly connected with said independently-supported frame, connecting parts between and flexibly connected with the free ends of said frames respectively and operatively connecting said frames, a vehicle-body, means connected with said body and operatively connecting the same with said connecting parts for the partial support of said body, and means connected with said body operatively connecting said body with said frames for the remaining support of said body.

3. In a vehicle, a frame having independent rolling supports operatively attached thereto and supporting said frame throughout its longitudinal extent, a frame supported at one end by independent rolling supports operatively attached thereto and supported at its other end by and operatively flexibly connected with said independently-supported frame, an auxiliary frame upon one of said independent frames for the support of motive mechanism for the propulsion of said vehicle to prevent the transmission of shocks and vibrations from the motive mechanism to the other of said frames.

4. In a vehicle, a frame having independent rolling supports operatively attached thereto and supporting said frame throughout its longitudinal extent, a frame supported at one end by independent rolling supports operatively attached thereto and supported at its other end by and operatively flexibly connected with said independently-supported frame, an auxiliary frame upon one of said independent frames for the support of motive mechanism for the propulsion of said vehicle, in combination with a vehicle-body partially supported by both said frames; whereby shocks and vibration from said motive mechanism are partially counteracted and diminished in transmission to said body.

5. In a vehicle, a frame having independent rolling supports operatively attached thereto and supporting said frame throughout its longitudinal extent, means for turning the supports at one end of said frame in planes at right angles to the revolution of said supports for steering said frame, in combination with a coöperating frame supported at one end by independent rolling supports operatively attached thereto and supported at its other end by said independently-supported frame, means operatively flexibly connecting said frames to cause said coöperating frame to follow and coöperate with the movements of said independently-supported frame, and a vehicle-body operatively connected with and supported by said frames; whereby independent movement is permitted to said frames while coöperating to support said body.

6. In a vehicle of the class described, the combination of an outside main frame provided with supporting-wheels, a supplementary frame pivotally connected on the front portion to the main frame and flexibly to the rear portion and provided with a driving-wheel, a supporting-platform pivotally connected to the supplemental frame at or near the axis of the driving-wheel and yieldingly supported on the supplementary frame at or near its front portion, substantially as described.

In testimony whereof I have signed my name to this specification in the presence of two subscribing witnesses.

BOHN C. HICKS.

Witnesses:
CHAS. C. TILLMAN,
A. GUSTAFSON.